July 16, 1968  H. RÜHLE  3,392,649
CAMERA FOR PERFORATED FILM MATERIAL
Filed Oct. 21, 1965
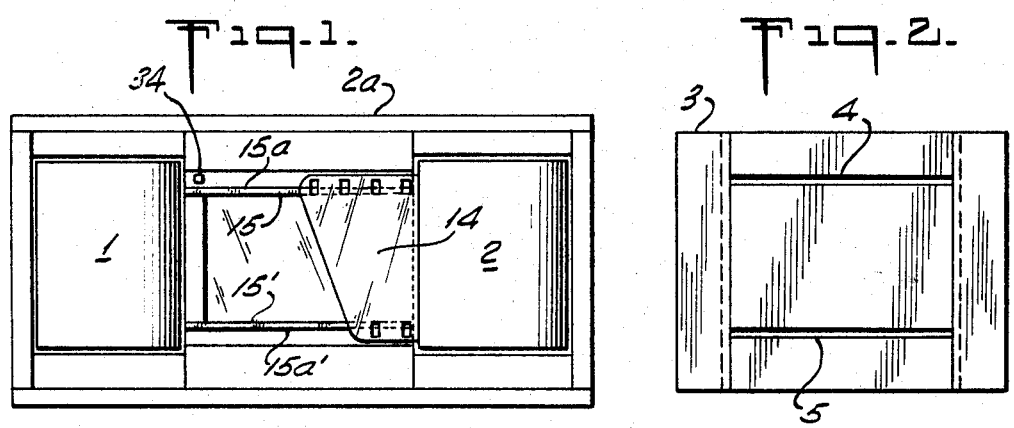
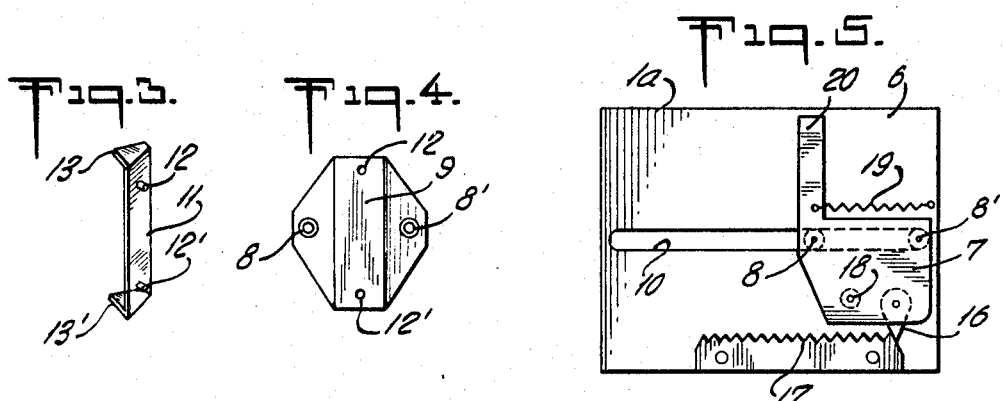
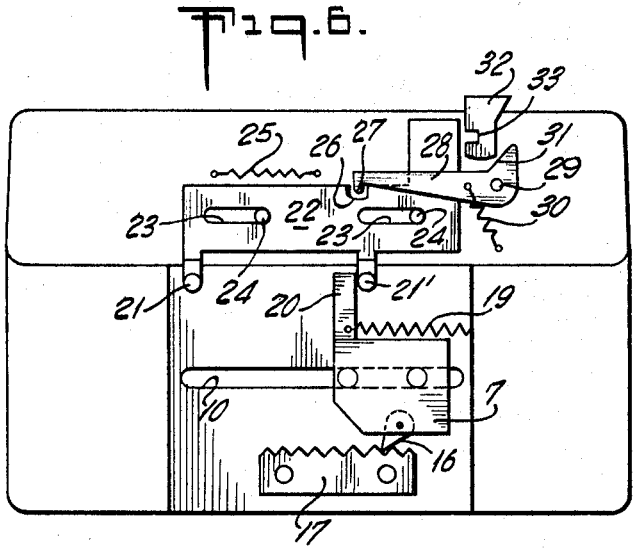
INVENTOR
HANNS RUHLE

United States Patent Office 3,392,649
Patented July 16, 1968

3,392,649
CAMERA FOR PERFORATED FILM MATERIAL
Hanns Rühle, Oberhermsdorf, Saxony, Germany, assignor to Kamerafabrik Woldemar Beier Kommanditgesellschaft, Saxony, Germany
Filed Oct. 21, 1965, Ser. No. 499,142
8 Claims. (Cl. 95—31)

The invention relates to a camera for perforated film material and in particular to a camera using film cartridges or the like.

The known cameras transport the perforated film by means of spiked rollers or grippers which are controlled from the housing of the camera. For this purpose, transfer elements are required which make it necessary to employ additional construction elements which also define the length of the camera. These additional construction elements use much camera space in the view finder section of the camera, and the spike rollers enlarge the length of the camera.

It is a purpose of this invention to eliminate these aforementioned shortcomings.

It is a further object of the invention to provide a camera which is extremely small in that it employs fewer components and which is uncomplicated in its construction and operation.

The objects of this invention will be achieved by the provision of an externally actuated slide which is guided within the rear wall of the camera housing. This slide carries a two-armed gripper which is under the influence of a leaf spring, and which engages the perforations of the film. A ratchet which is under the influence of a spring is pivotably mounted on the slide and moves about a fixedly mounted toothed rack which relieves the ratchet after the transportation of the film by means of a return spring. The two-armed gripper is provided with one-sided beveled points which extend only in one of the moving directions thereof.

The entire film switching arrangement is built into or onto the rear wall of the camera and forms a compact construction therewith. By arranging the film transport to the rear wall of the camera housing, much space remains in the view finder section which can be used for incorporating flashlight and/or light measuring devices. Shafts, knobs and switching levers are eliminated from the camera housing when using film cartridges or film rolls which operate on the inventive principles described herein.

According to a primary embodiment of the invention, a trip ratchet is provided in the camera housing and is longitudinally movable therein. The trip ratchet comprises two stops which limit the direction of movement of the slide, whereby the stops alternately release the trip ratchet. The trip ratchet, which is formed in one piece and which is preferably made from sheet metal, is under the influence of a spring and comprises an aperture into which a nose of an externally actuated lever engages. At the end position of the slide, which is defined by one of the stops, the trip ratchet is still in contact with the toothed rack from which it will be released only after actuating the trip lever. The film transport arrangement is so constructed that idle switchings are eliminated.

The various features of novelty which characterize the invention are pointed out with particularity in the claims annexed to and forming a part of the specification. For a better understanding of the invention, its operating advantages and the specific objects attained by its use, reference should be had to the accompanying drawings and descriptive matter in which:

FIG. 1 is an elevational view of the camera housing according to a first embodiment of the invention;

FIG. 2 is a view of the sheet metal guide within the rear wall of the camera housing;

FIG. 3 is a view of the two-armed gripper;

FIG. 4 is a view of the leaf spring which is connected to the two-armed gripper shown in FIG. 3;

FIG. 5 is a view of a cover plate together with the parts secured thereon; and

FIG. 6 is a view of a rear wall of the housing according to a second embodiment of the invention.

With reference to the drawings it can be seen that film cartridges 1 and 2 are located close to an aperture, and leave only as much space as is required for the image area. According to the first embodiment, as shown in FIGS. 1 to 5, it can be seen that a guide sheet 3 is inserted into a rear wall 1a of camera housing 2a. Guide sheet 3 comprises two longitudinal slots 4 and 5, and is covered by a cover plate 6. A slide 7 is reciprocably movable between guide sheet 3 and cover plate 6. A leaf spring 9 is secured to slide 7 by means of rivets 8 and 8'. The rivet heads are guided in a slot 10 of cover plate 6. Slot 10 corresponds, in its lengthwise direction, to the film transporting distance.

Leaf spring 9 is bent in its longitudinal direction and firmly connected with a two-armed gripper 11, for instance, by means of rivets 12 and 12'. Gripper 11, has bent tips 13 and 13' on both ends thereof, which extend through longitudinal slots 4 and 5 of guide sheet 3, and engage the perforations on a film strip 14.

Tips 13 and 13' of gripper 11 are beveled on one side thereof, so that they are able to engage the perforations of the film in the direction of transport movement, and slide about these perforations during the return movement. The support strips 15a and 15a' of film path 15 and 15' are so arranged that they only cover one-half of the perforations laterally thereon, while the other half thereof is arranged in a recess for receiving gripper tips 13 and 13'.

A deflection of guide sheet 3, presses against film path 15 and 15' in such a way, that a film channel is created, which does not permit a bending of the film.

A ratchet 16 is pivotally mounted on slide 7 which is permanently held in a vertically central position by means of a spring (not shown). Ratchet 16 slides about a toothed rack 17 which is permanently secured to cover plate 6, and which is limited in its length, and which also corresponds to the film transport distance. For transporting the film, slide 7 is moved by means of a hand lever (not shown) which extends from rear wall 1a of camera housing 2a and which is threaded into a tapped hole 18 of slide 7.

A cover for the recess in the rear wall of the camera, so as not to allow any light to enter the camera housing, is provided by means of a yieldably mounted sheet metal blade. During the shifting of the slide, gripper 11 engages the perforations of the film with its associated tips 13 and 13', and thus transports the film for about one picture length. Ratchet 16, which is effective in both directions, slides over toothed rack 17 during the transport movement of the film, and prevents a return movement of slide 7 before completion of the film transport. After completion of the film transport, ratchet 16 will be released due to the limited length of toothed rack 17. A return spring 19 pulls slide 7 into its initial position, whereby ratchet 16 operates as a slide. Due to the bevelled sides, tips 13 and 13' of gripper 11 slide also in a return movement about the perforations.

To prevent double exposure, slide 7 carries an extended arm 20 which actuates a cam 34, after the completion of the film transport. Cam 34 is arranged within the camera housing, that is, in the film path 15, as can be seen in FIG. 1. Arm 20 pushes cam 34 aside at the end of the film transport movement, thus releasing a known warning signal in the view finder, the trip ratchet and a known counting device.

According to a second embodiment of the invention, as shown in FIG. 6, slide 7 reciprocates on the rear wall of the camera housing within slot 10. Slide 7, carries the gripper arrangement for transporting the film material. Ratchet 16 is pivotably mounted on slide 7, and is held constantly in its central vertical position by means of a spring (not shown). Ratchet 16 slides above a toothed rack 17 which is permanently secured to the camera housing and is limited in its length in accordance with the length of the film transport.

Slide 7 carries an extended arm 20 which cooperates with two pins 21 and 21'. Pins 21 and 21' are arranged at trip ratchet 22. The latter is longitudinally movable by means of pins 24 which move in slots 23 and is under the influence of a tension spring 25. On the upper edge, trip ratchet 22 comprises an aperture 26 into which a nose 27 of a two armed lever 28 engages which pivots around a pin 29 and which is under the influence of a tension spring 30. One of the arms of lever 28 comprises a bevelled sliding face 31 against which an externally actuated member 32 bears.

As can be seen in FIG. 6, arm 20 of slide 7 engages pin 21' of trip ratchet 22. After the completion of the film transport, arm 20 presses pin 21 into the left until it engages the left side limit stop, thereby, lever 28 can move into recess 26 of trip ratchet 22 under the influence of tension spring 30, and thus retain trip ratchet 22 in its position. When slide 7 returns to its initial position under the influence of return spring 19, it is arrested by means of pin 21' of trip ratchet 22. At that point, ratchet 16 is not yet removed from the toothed rack 17. The inclined position of ratchet 16 against the transport movement prevents a double film transport.

Only after the actuation of a trigger 32, to release lever 28, by means of its beveled face 31, trip ratchet 22 is also released, whereupon tension spring 25 returns trip ratchet 22 to its stop. Pin 21' which is permanently secured to trip ratchet 22 releases slide 7 which returns to its initial position, and ratchet 16 is freely located in front of toothed rack 17 for the next film transport. Thereby, trip ratchet 22 slides into a notch 33 of trigger 32 and releases the latter only after completed film transport.

This invention should not, however, be limited to the specific embodiments shown by the appended drawings, but rather defined by the scope of the appended claims.

What I claim is:

1. Film feeding device for use in photographic camera to feed perforated film material comprising: a housing, a slide arranged at the inside of the rear wall of said housing, a trigger means being arranged at the outside of said housing for actuating said slide, a gripper means having a plurality of arms mounted on said slide, said arms of said gripper engage a plurality of perforations of said film material, a leaf spring operatively connected to said gripper, for moving said gripper arms into engagement with said perforations, of said film material, a ratchet pivotally mounted by means of springs on said slide, a toothed rack permanently arranged on said rear wall of said housing about which said ratchet is slidably moving, and a return spring mounted on an extension of said slide at said rear wall of said housing for returning said ratchet after completion of said film transport.

2. Film feeding device according to claim 1, wherein said gripper means comprises a plurality of arms, each of said arms being provided with bevelled tips on one side thereof.

3. Film feeding device according to claim 1, wherein said slide comprises an arm extending vertically therefrom for movement with said slide, and a cam extending into the path of said arm.

4. Film feeding device according to claim 1, wherein a trip ratchet is longitudinally mounted at said rear wall of said housing, said trip ratchet being provided with a plurality of stops for limiting the movement of said slide, said stops alternately releasing said trip ratchet.

5. Film feeding device according to claim 4, wherein said trip ratchet comprises an aperture, and a lever having a nose which engages the aperture after being actuated by said trigger.

6. Film feeding device according to claim 5, wherein said trip ratchet glides into a notch of said trigger, when said trip ratchet is in its arresting position.

7. Film feeding device according to claim 1 wherein said ratchet is in engagement with said toothed rack during the arrested end position of said slide defined by one of said stops, said ratchet being released from its rest position after actuation of said trigger.

8. Film feeding device according to claim 1, wherein said film feeding device is mounted on said rear wall of said housing thus forming an integral part therewith.

References Cited
UNITED STATES PATENTS

| | | | |
|---|---|---|---|
| 2,591,417 | 4/1952 | Frye | 95—31 |
| 2,931,283 | 4/1960 | Schreiber | 95—31 |
| 3,148,605 | 9/1964 | Peterson et al. | 95—31 |
| 3,232,196 | 2/1966 | Sapp et al. | 95—31 |
| 3,253,526 | 5/1966 | Steisslinger | 95—31 |

NORTON ANSHER, *Primary Examiner.*

R. A. SCHROEDER, *Assistant Examiner.*